United States Patent [19]

Sasaki et al.

[11] 4,003,021
[45] Jan. 11, 1977

[54] LEVEL DETERMINATION FOR OPTICAL CHARACTER READER

[75] Inventors: Hiromu Sasaki, Yamatokoriyama; Syoichi Yasuda, Nara; Humikazu Nagano, Yamatokoriyama, all of Japan

[73] Assignee: Sharp Kabushiki Kaisha, Osaka, Japan

[22] Filed: Mar. 24, 1975

[21] Appl. No.: 561,233

[30] Foreign Application Priority Data

| Mar. 23, 1974 | Japan | 49-34289 |
| Mar. 23, 1974 | Japan | 49-34290 |
| Mar. 23, 1974 | Japan | 49-34291 |

[52] U.S. Cl. .................................. 340/146.3 AG
[51] Int. Cl.² ........................................ G06K 9/02
[58] Field of Search ............ 340/146.3 AG; 178/7.6

[56] References Cited

UNITED STATES PATENTS

| 3,159,815 | 12/1964 | Groce | 340/146.3 |
| 3,202,042 | 8/1965 | Jamieson et al. | 340/146.3 AG |
| 3,599,151 | 8/1971 | Harr | 340/146.3 AG |
| 3,692,982 | 9/1972 | McMillin | 340/146.3 AG |
| 3,800,078 | 3/1974 | Cochran et al. | 340/146.3 AG |
| 3,872,434 | 3/1975 | Duvall et al. | 340/146.3 AG |

OTHER PUBLICATIONS

Simpson, "Optical Density Quantizer" *IBM Tech. Disclosure Bulletin*, vol. 5, No. 9, Feb., 1963, p. 71.
Frechette et al., "Detection Range Expansion of A CRT Scanner," *IBM Tech. Disclosure Bulletin*, vol. 13, No. 12, May, 1971, pp. 3626–3627.

*Primary Examiner*—Leo H. Boudreau
*Attorney, Agent, or Firm*—Stewart and Kolasch, Ltd.

[57] ABSTRACT

Optical information on a card is read by an image sensor and then converted to a video signal represented by a digital signal of several bits through the use of an amplifier and an A - D converter. A reference level is determined by scanning a reference portion which is preferably provided along one edge of the card. The video signal is quantized by comparing with three sliced levels corresponding to 0.5, 0.75 and 0.85 times the reference level. The quantized information is applied to a recognition station.

4 Claims, 13 Drawing Figures

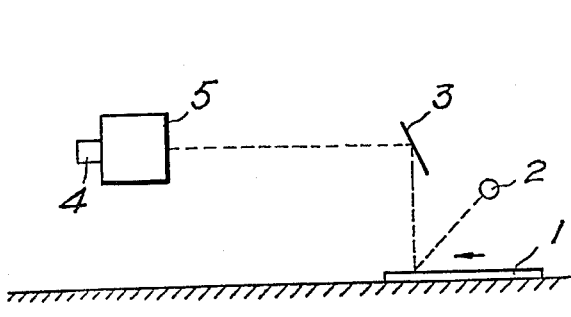
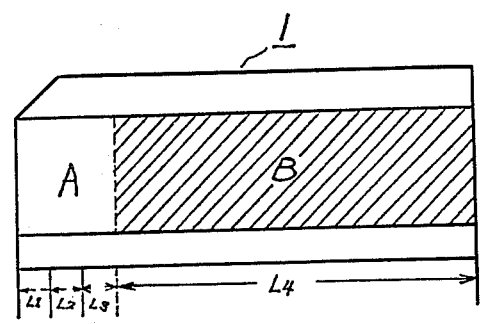
FIG. 1    FIG. 2
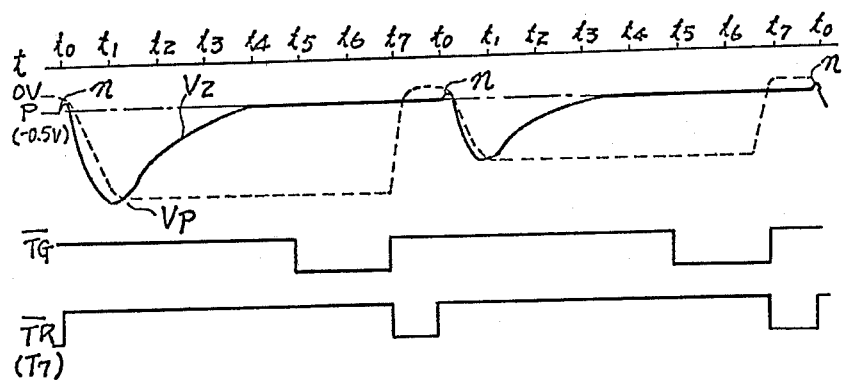
FIG. 9
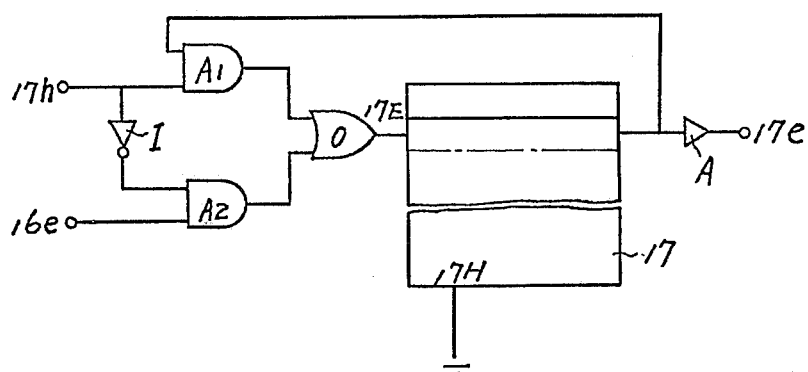
FIG. 11
(Shift Register -17-)

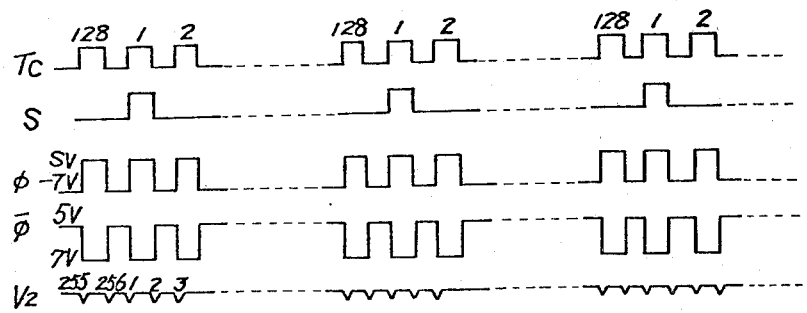
FIG. 5
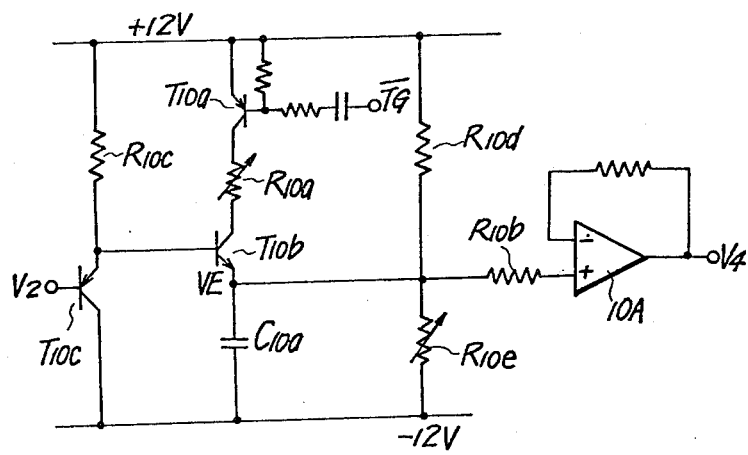
FIG. 8 (Level Detector -10-)

(Amplifier -8-)

(Peak Value Follower -9-)

(Compensation Circuit -14-)

LEVEL DETERMINATION FOR OPTICAL CHARACTER READER

BACKGROUND AND SUMMARY OF THE INVENTION

The present invention relates to a level determination system for an optical character reader.

Generally, an optical character reader has a photoelectric converter comprising a photodiode array of the self-scanning type including a number of photodiodes integrated on a single chip. Respective output levels of the photodiodes are unavoidably different from each other, and it is almost impossible to irradiate the whole surface of the card at a uniform intensity. Therefore, the optical character reader is of low reliability when the respective output signals of the photodiodes are directly quantized with reference to a predetermined sliced level to produce signals "1" and "0" which will be applied to a recognition station. Moreover, when video signals from the photodiode array is amplified with the use of an amplifier of high speed operation, DC characteristics, such as drift, of the high speed operation amplifier will be included within the amplified video signals.

Accordingly, an object of the present invention is to provide a novel level determination system useful for an optical character reader.

Another object of the present invention is to provide a novel network for quantizing video signals generated with the use of output signals from a photodiode array in order to provide "1" and "0" signals to be applied to a recognition stage in an optical character reader.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to the present invention, a reference level is determined by scanning a reference portion which is preferably provided along one edge of the card. Amplified video signals corresponding to optical information written on the card are quantized to "1" and "0" signals by comparing among three sliced levels which are 0.5, 0.75 and 0.85 times the reference level. The quantized signals are then applied to a recognition station.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 1 is a schematic illustration of an optical system included within an optical character reader employing a level determination system of the present invention;

FIG. 2 is a plan view of a card suited for an optical character reader employing a level determination system of the present invention;

FIG. 5 is a time chart showing relationship between amplified output signals $V_2$ from an image sensor and the clock signals illustrated in FIG. 4;

FIG. 8 is a circuit diagram of the level detector shown in FIG. 3;

FIG. 9 is a time chart showing the amplified output signals $V_2$ illustrated in FIG. 5 in detail;

FIG. 11 is a block diagram of a shift register included within the compensation circuit shown in FIG. 10.

DESCRIPTION OF THE PREFERRED EMBODIMENTS

Figure 3:
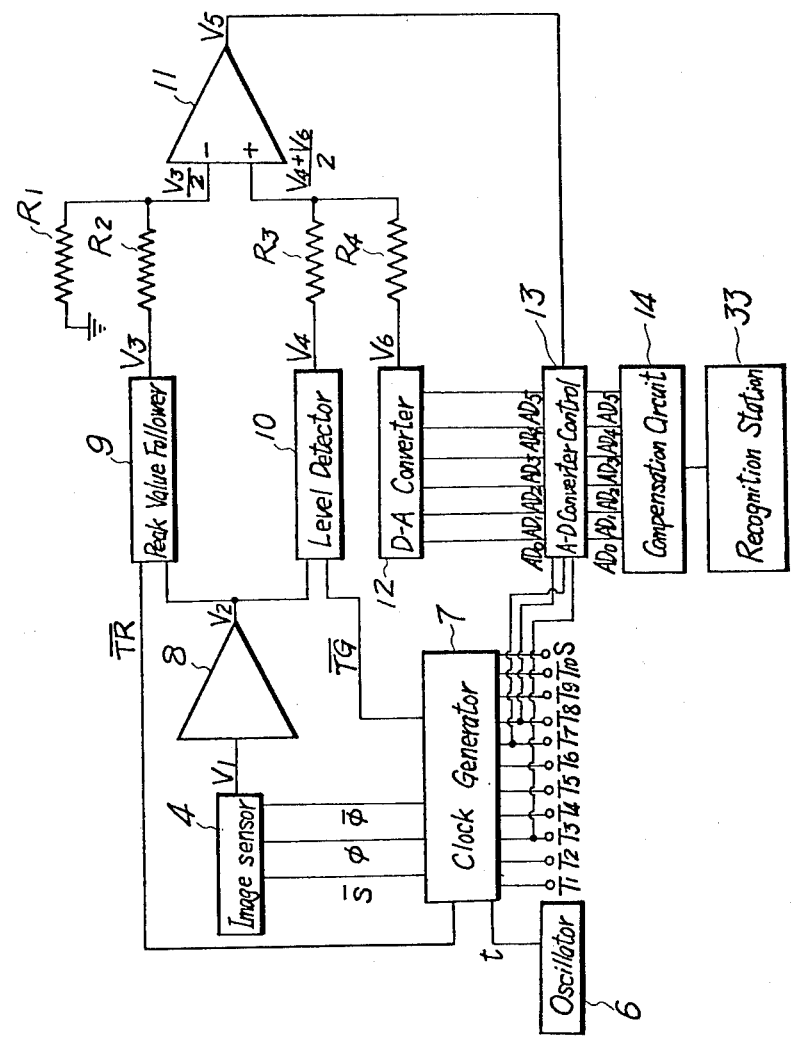
FIG. 3 is a block diagram of an embodiment of a level determination system of the present invention, including an amplifier, a peak value follower, a level detector, and a compensation circuit.

Referring now to drawings, there is illustrated an embodiment of a level determination system of the present invention suited for an optical character reader, wherein an image sensor comprises a photodiode array of the selfscanning type including 256 photodiodes integrated on a single chip.

FIG. 1 schematically shows an optical system of an optical character reader. A light source 2 is provided for irradiating a traveling card 1. The reflected light is introduced into a lens unit 5 associated with an image sensor 4 via a mirror 3.

FIG. 2 shows the card 1 suited for the optical character reader employing a level determination system of the present invention. A white portion A is provided along one edge of the card 1 for determining a reference level. Optical information is written on an information portion B shown by oblique lines.

Referring now to FIG. 3, there is illustrated an embodiment of a level determination system of the present invention, wherein a video output including optical information from the image sensor is amplified and then converted to a video signal of 6 bits by an A - D converter and thereafter applied to a compensation circuit in order to provide a signal to be applied to a recognition station.

Figure 4:
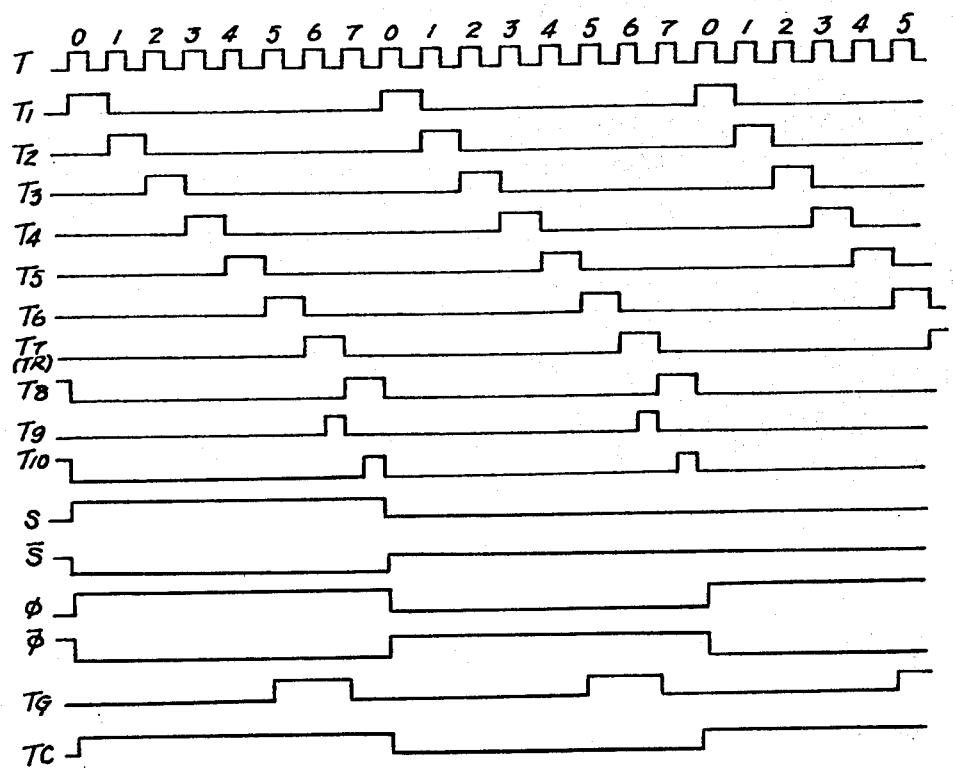
FIG. 4 is a time chart of various clock signals occurring within the system of FIG. 3.

An oscillator 6 provides a clock pulse T shown in FIG. 4 for a clock generator 7, which divides the clock pulse T by 8 to provide various pulses $T_1$ through $T_{10}$, S, $\bar{S}$, $\phi$, $\bar{\phi}$, $T_G$, $T_R$ and $T_C$. The pulse $T_R$ is identical with the pulse $T_7$. The pulse S can be provided by dividing the pulse $T_C$ by 128 and is "1" during the first pulse of the pulse train of 128 $T_C$ pulses is "1" as shown in FIG. 5. The pulse $\phi$ can be provided by amplifying the pulse $T_C$ and has the phase and frequency identical with that of the pulse $T_C$. The pulse $T_C$ is generated from a flip-flop (not shown) which changes its output states upon the leading edge of the pulse $T_1$.

Figure 6:
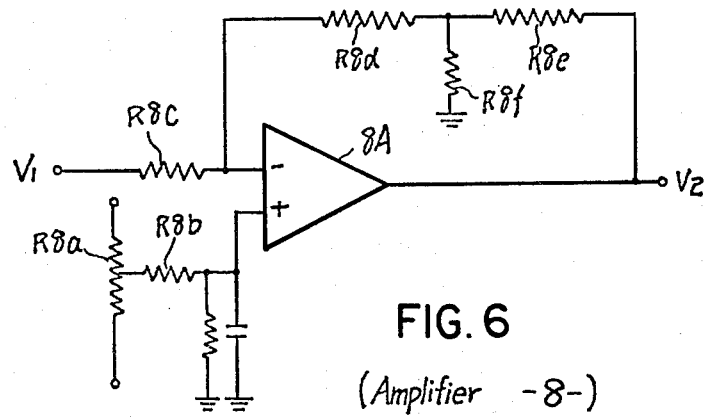
FIG. 6 is a circuit diagram of the amplifier shown in FIG. 3.

An image sensor 4 comprising a photodiode array of 256 photodiodes provides a video output $V_1$ including optical information written on the card 1 for an amplifier 8 in synchronization with the pulses S, $\phi$ and $\bar{\phi}$. FIG. 5 shows relationship between the pulses $\phi$, $\bar{\phi}$ and an output $V_2$ of the amplifier 8. A typical circuit construction of the amplifier 8 is shown in FIG. 6. An inverted amplifying circuit including an operational amplifier 8A is well known in the art, and wherein a potentiometer R8a and a resistor R8b are provided for an offset adjustment. A reference level P (see FIG. 9) of the output $V_2$ of the amplifier 8 is adjustable to assume about −0.5 volts with the use of the potentiometer R8a and the resistor R8b. A peak value Vp of the output $V_2$ is adjusted within the range of −3 volts with respect to the reference level P with the use of resistors R8c through R8f. The reference level P of the output $V_2$ of the operational amplifier 8A unavoidably drifts in a fashion dependent upon the ambient temperature. Such drift can be compensated by a peak value follower 9.

Figure 7:
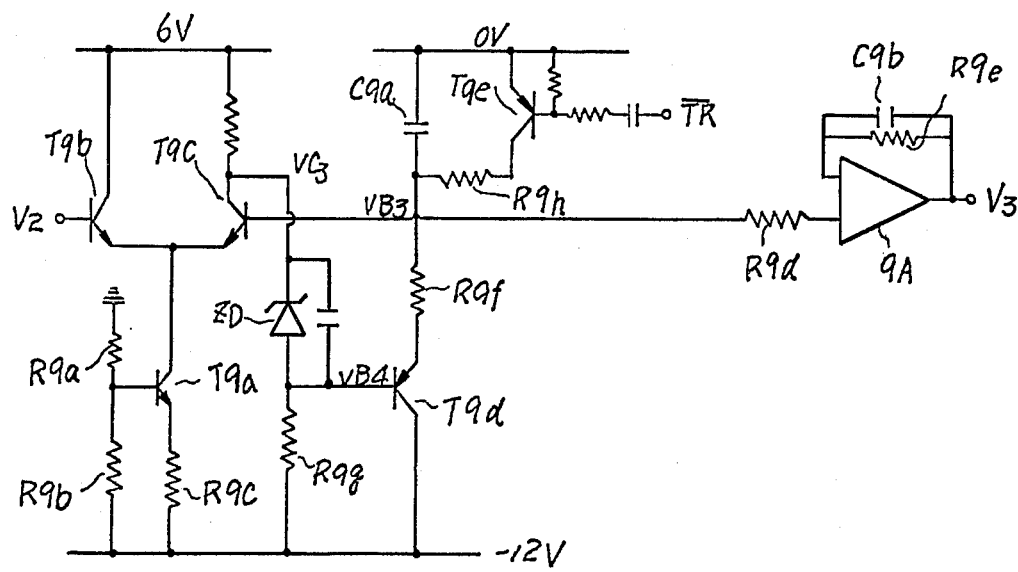
FIG. 7 is a circuit diagram of the peak value follower shown in FIG. 3.

The output $V_2$ of the amplifier 8 and a pulse $\overline{T_R}$ from the clock generator 7 are applied to the peak value follower 9, the detailed circuit construction of which is shown in FIG. 7. A constant-current source is provided by resistors R9a through R9c and a transistor T9a, and a differential amplifier is formed by transistors T9b and T9c. The base of the transistor T9b is connected to receive the output $V_2$ of the amplifier 8, whereas the base of the transistor T9c is connected with one terminal of a capacitor C9a, which maintains the peak value, and a resistor R9d in order to output a signal to a voltage follower comprising the resistor R9d, a resistor R9e, a capacitor C9b and an operational amplifier 9A. The charging operation for the capacitor C9a is controlled by a transistor T9d via a resistor R9f. The base potential $VB_4$ of the transistor T9d is below the Zener voltage of a Zener diode ZD than the collector potential $VC_3$ of the transistor T9c. In this embodiment, the Zener voltage is 5.6 volts and, therefore, the base potential $VB_4$ of the transistor T9d is below than the collector potential $VC_3$ of the transistor T9c by 5.6 volts. A resistor R9g is provided for applying bias current to the Zener diode ZD. The discharging operation of the capacitor C9a is controlled by a transistor T9e through a resistor R9h. The transistor T9e is ON when the pulse $\overline{T_R}$ is "0", whereas the transistor T9e is OFF when the pulse $\overline{T_R}$ is "1". The peak value follower 9 is reset when the pulse $\overline{T_R}$ is "0".

The operation mode of the peak value follower 9 will be described in detail with reference to FIG. 9 time chart. When the output level $V_2$ of the amplifier 8 begins to decrease under the condition where the peak value follower 9 is reset and hence the base potential $VB_3$ of the transistor T9c is 0 volts, the collector potential $VC_3$ of the transistor T9c and the base potential $VB_4$ of the transistor T9d begins to fall, and hence the capacitor C9a is charged through the transistor T9d and the resistor R9f and, therefore, the base potential $VB_3$ of the transistor T9c, which is identical with a potential of an output signal $V_3$ of the peak value follower 9, follows the output signal $V_2$ of the amplifier 8 with a slight delay. When the output signal $V_2$ exceeds the peak value Vp, the collector potential $VC_3$ of the transistor T9c and the base potential $VB_4$ of the transistor T9d begin to increase and, therefore, the transistor T9d becomes OFF to prevent the charging operation to the capacitor C9a. The charge on the capacitor C9a is maintained till the pulse $\overline{T_R}$ becomes "0" and, therefore, the base potential $VB_3$ of the transistor T9c, which is identical with the potential of the output signal $V_3$ of the peak value follower 9, is substantially maintained at the peak value Vp of the output signal $V_2$ of the amplifier 8 till the pulse $\overline{T_R}$ becomes "0". The output signal $V_3$ of the peak value follower 9 is reduced one half by resistors $R_1$, $R_2$ and then applied to an inverting input terminal of a voltage comparator 11.

A level detector 10 is connected to receive the output signal $V_2$ of the amplifier 8 and a signal $\overline{T_G}$ from the clock generator 7, and outputs an output signal $V_4$. A typical circuit construction of the level detector 10 is shown in FIG. 8. A transistor $T_{10a}$ is ON when the pulse $\overline{T_G}$ is "0". The emitter of the transistor $T_{10a}$ is connected with a power line of +12 volts, whereas the collector of the transistor $T_{10a}$ is connected with a power source of −12 volts via a variable resistor $R_{10a}$, a transistor $T_{10b}$ and a capacitor $C_{10a}$. The emitter of the transistor $T_{10b}$ is connected with a non-inverted input terminal of an operational amplifier 10A via a resistor $R_{10b}$ to provide an output signal VE. The base of the transistor $T_{10b}$ is connected with the emitter of a transistor $T_{10c}$ which receives the output signal $V_2$ of the amplifier 8 at the base electrode thereof. The emitter of the transistor $T_{10c}$ is also connected to the voltage source of +12 volts via a resistor $R_{10c}$. A resistor $R_{10d}$ and a variable resistor $R_{10e}$ are provided for forming the charging path and the discharging path of the capacitor $C_{10a}$.

The level detector 10 is substantially a peak value follower and the operation thereof is as follows. The level detector 10 is effective only when the transistor $T_{10a}$ is ON. The emitter potential VE of the transistor $T_{10b}$, which is identical with the output signal $V_4$ of the operational amplifier 10A, is maintained around a predetermined value by the capacitor $C_{10a}$. The level detector 10 has a gating function, since the output level of the amplifier 8 exceeds the reference level P of the output signal $V_2$ at the beginning of the output signal $V_2$ of the amplifier 8 because of a switching noise n as shown in FIG. 9. The capacitor $C_{10a}$ is charged through the transistors $T_{10a}$, $T_{10b}$ and a resistor $R_{10a}$ when the transistors $T_{10a}$ and $T_{10b}$ are ON. When the reference level P of the output signal $V_2$ of the amplifier 8 is higher than the emitter potential $V_E$ of the transistor $T_{10b}$, the capacitor $C_{10a}$ is charged upon the transistor $T_{10b}$ is ON, whereby the emitter potential $V_E$ approximates the reference level P of the signal $V_2$. Consequently, the charging function to the capacitor $C_{10a}$ through the transistor $T_{10b}$ and the resistor $R_{10d}$ and the discharging function from the capacitor $C_{10a}$ to the voltage source of −12 volts through the resistor $R_{10e}$ are balanced each other. At this time the emitter potential $V_E$ is maintained around the reference level P of the signal $V_2$. The emitter potential $V_E$ is applied to the noninverting input terminal of the operational amplifier 10A, which provides the output signal $V_4$. Therefore, the level of the output signal $V_4$ approximates the reference level P of the output signal $V_2$ of the amplifier 8.

The inverting input terminal of the voltage comparator 11 is connected to receive the signal of half the potential of the output $V_3$ of the peak value follower 9 through the resistors $R_1$ and $R_2$, as discussed above. The non-inverting input terminal of the voltage comparator 11 is connected to receive a signal $V_4 + V_{6/2}$, where $V_4$ is the output of the level detector 10 and $V_6$ is an output of a D - A converter 12, which will be described later, through resistors $R_3$ and $R_4$, where $R_1 = R_2 = R_3 = R_4$. The output $V_5$ of the voltage comparator 11 is "1" when $V_4 + V_{6/2} > V_{3/2}$, whereas "0" when $V_4 + V_{6/2} < V_{3/2}$.

The output $V_6$ of the D - A converter 12 can be expressed as follows:

$$V_6 = (AD_0 \times 2^0 + AD_1 \times 2^1 + AD_2 \times 2^2 + AD_3 \times 2^3 + AD_4 \times 2^4 + AD_5 \times 2^5) \times 0.05 \text{ volts}$$

where, $AD_0$ through $AD_5$ are output signals of an A - D converter control 13, and are "1" or "0". Therefore, $0 \leq V_6 \leq 3.15$ volts.

The A - D converter control 13 forms an A - D converter in combination with the voltage comparator 11 and the D - A converter 12. Thus formed A - D converter performs its A - D converting operation during a time period determined by the leading edge of the pulse $T_3$ and the leading edge of the pulse $T_7$ generated from the clock generator 7, and is reset at the time determined by the leading edge of the pulse $T_8$. The six bits signal comprising $AD_0$, $AD_1$, - $AD_5$ maintains the A - D converted value during the time period when the pulse $T_7$ is "1". The input condition to the voltage comparator 11 at the time when the output $V_5$ of the voltage comparator 11 is inverted at the polarity thereof is $(V_3 - V_4) = V_6$, since $V_{3/2} = V_4 + V_{6/2}$. It will be noted that the value $(V_3 - V_4)$, which will be A - D converted, does not include any alternating elements caused by the drift of the amplifier 8. The video signal $V_2$ exactly corresponding to the optical information will be A - B converted.

The level determination system of the present invention amplifies the output signal of the image sensor 4 including the optical information with the use of the amplifier 8, and then provides the video signal exactly corresponding to the optical information by eliminating the undesirable effects caused by the drift of the amplifier 8, and thereafter the video signal is A - D converted to provide the signals $AD_0 - AD_5$ of 6 bits. The 6 bits signal is applied to a following compensation circuit 14 during a time period when the pulse $T_7$ generated by the clock generator 7 is "1".

Figure 10:
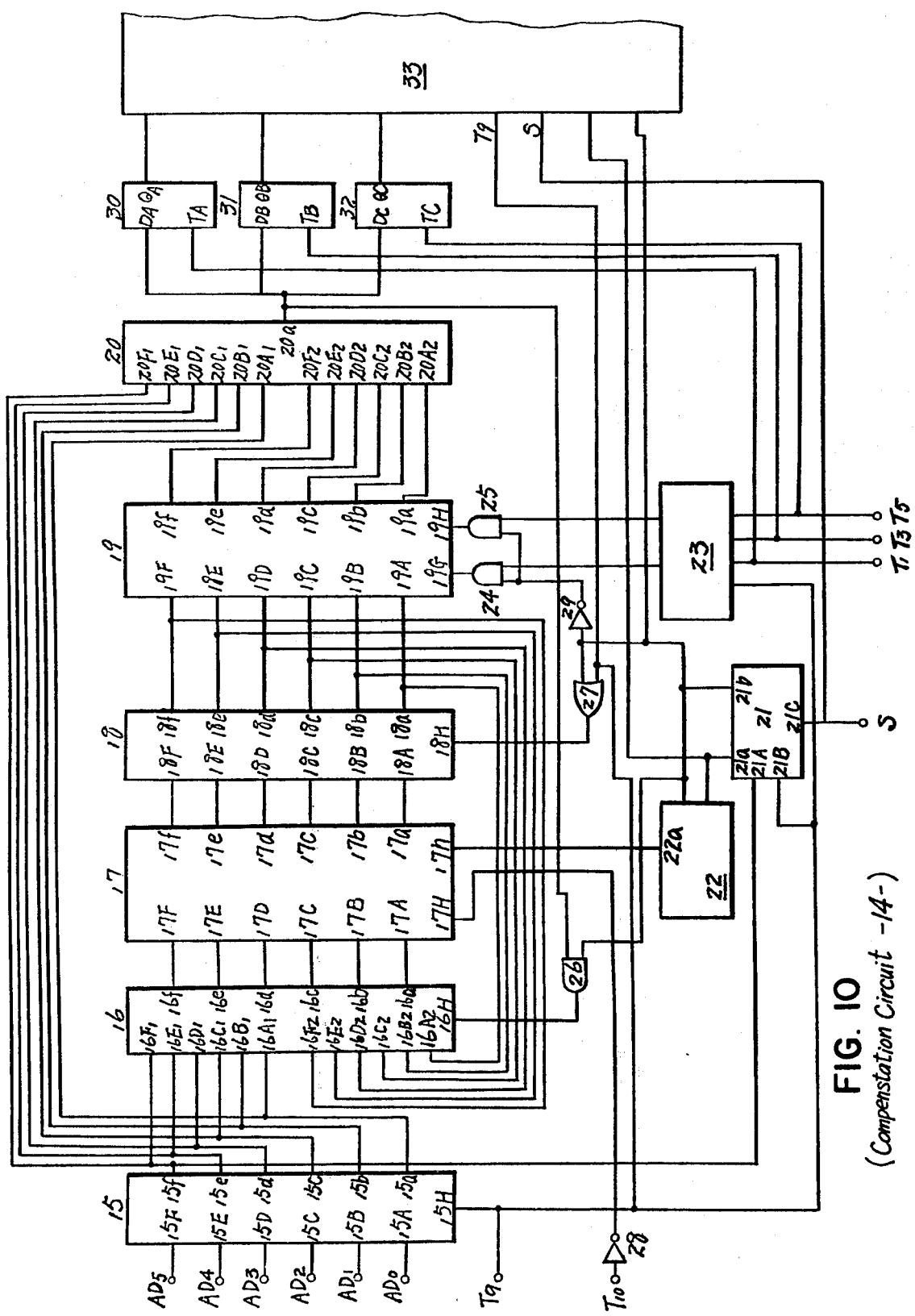
FIG. 10 is a block diagram of the compensation circuit shown in FIG. 3.

Referring now to FIG. 10, there is illustrated a typical circuit construction of the compensation circuit 14. A latch circuit 15 of 6 bits comprises input terminals 15A through 15F, respective of which receive the signals $AD_0$ through $AD_5$ of 6 bits generated by the A - D converter control 13, and a control terminal 15H for receiving the pulse $T_9$ from the clock generator 7. The latch circuit 15 further comprises output terminals 15a through 15f, respective of which output the signals introduced to the input terminals 15A through 15F when the input signal to the control terminal 15H is "1", and output the signals corresponding to the input conditions at the time when the input signal to the control terminal 15H changes from "1" to "0" during the time period when the input signal to the control terminal 15H is "0". The latch circuit 15 is so constructed that the output thereof changes when the input signal to the control terminal 15H changes from "0" to "1", since the input signals to the latch circuit 15 are maintained at a stable condition when the signal to the control terminal 15H is "1".

A data selector 16 comprises two sets of input terminals $16A_1$ through $16F_1$ and $16A_2$ through $16F_2$, and a selection terminal 16H. The data selector 16 further comprises a set of output terminals 16a through 16f, which respectively output the input signals to the input terminals $16A_1$ through $16F_1$ when the input signal to the selection terminal 16H is "0", and output the input signals to the input terminals $16A_2$ through $16F_2$ when the input signal to the selection terminal 16H is "1". The respective input terminals $16A_1$ through $16F_1$ are connected with the output terminals 15a through 15f of the latch circuit 15, whereas the respective input terminal $16A_2$ through $16F_2$ are connected with output terminals 18a through 18f of another latch circuit 18, which will be described later.

A shift register 17 comprises 6 shift registers in a parallel fashion, each of which has the capacity of 256 bits. The shift register 17 further comprises input terminals 17A through 17F and output terminals 17a through 17f in correspondence with the respective 6 shift registers, a shift signal input terminal 17H, and a circulation control terminal 17h, the shift signal input terminal 17H and the circulation control terminal 17h being commonly connected with the respective 6 shift registers. The contents of each of the 6 shift registers are shifted to the adjacent bits when the input signal to the shift signal input terminal 17H changes from "1" to "0", the input signal to the shift signal input terminal 17H being generated by inverting the pulse $T_{10}$ from the clock generator 7 with the use of an inverter 28. The circulation control terminal 17h is connected to receive output signals of a shift register control circuit, which will be described later. The respective input terminals 17A through 17F receive the output signals from the output terminals 16a through 16f of the data selector 16 when the signal applied to the circulation control terminal 17h is "0", whereas the respective input terminals 17A through 17F receive the output signals from the output terminal 17a through 17f of the shift register 17 when the signal applied to the circulation control terminal 17h is "1" in order to circulate the contentes thereof.

A typical circuit construction of the shift register 17 is shown in FIG. 11. A 256 bits shift register included within the shift register 17 comprises AND gates $A_1$, $A_2$ and an OR gate O. The input terminal 17E is connected to receive either the output signal of the output terminal 16e of the data selector 16 or the output signal of the shift register of 256 bits. When the signal "1" is applied to the circulation control terminal 17h, the AND gate $A_1$ is ON upon receiving the output signal from the shift register of 256 bits, thereby circulating the contents of the shift register of 256 bits through the AND gate $A_1$ and the OR gate O. The circulating operation is maintained till the signal to the circulation control terminal 17h becomes "0". When the signal "0" is applied to the circulation control terminal 17h, one terminal of the AND gate $A_2$ receives a signal "1" through an inverter I and, therefore, the AND gate $A_2$ is ON upon receiving the output signal of the output terminal 16e of the data selector 16. In this instance, the output of the data selector 16 is applied to the shift register of 256 bits via the AND gate $A_2$ and the OR gate O. The shift register provides output signals at the output terminal 17e via an amplifier A, which is shifted its level in synchronization with the signal applied to the shift signal input terminal 17H.

Another latch circuit 18 comprises input terminals 18A through 18F, which respectively receive the signals of 6 bits from the output terminals 17a through 17f of the shift register 17, and a control terminal 18H for receiving signals from circuits which will be described later. The latch circuit 18 further comprises output terminals 18a through 18f, of which respectively output the signals introduced to the input terminals 18A through 18F when the input signal to the control terminal 18H is "1", and output the signals corresponding to the input conditions at the time when the input signal to the control terminal 18H changes from "1" to "0" during the time period when the input signal to the control terminal 18H is "0". The latch circuit 18 is constructed so that the output thereof changes when the input signal to the control terminal 18H changes from "0" to "1", since the input signals to the latch circuit 18 is maintained at a stable condition when the signal to the control terminal 18H is "1".

A read only memory 19 has the input capacity of 8 bits, namely, 256 addresses and the output capacity of 6 bits. The read only memory 19 comprises input terminals 19A through 19H and output terminals 19a through 19f. The input terminals 19G and 19H serve as control terminals. The output terminals 19a through 19f provide the signals introduced to the input terminals 19A through 19F when the both input signals to the control terminals 19G and 19H are "0". The output terminals 19a through 19f provide the signals the levels of which approximate 0.85 times that of the input signals to the input terminals 19A through 19F when the input signals to the control terminals 19G and 19H are "1" and "0", respectively. The levels of the output signals from the output terminals 19a through 19f approximate 0.75 times that of the input signals to the input terminals 19A through 19F when the input signals to the control terminals 19G and 19H are "0" and "1", respectively. The levels of the output signals from the output terminals 19a through 19f approximate 0.5 times that of the input signals to the input terminals 19A through 19F when the both signals to the control terminals 19G and 19H are "1".

A comparator 20 of 6 bits comprises two sets of input terminals $20A_1$ through $20F_1$ and $20A_2$ through $20F_2$ of 6 bits. An output terminal 20a provides a signal "0" when the signals applied to the input terminals $20A_1$ through $20F_1$ are greater than the signals applied to the input terminals $20A_2$ through $20F_2$, whereas provides a signal "1" when the signals to the input terminals $20A_1$ through $20F_1$ are less than the signals to the input terminals $20A_2$ through $20F_2$.

A card detection unit 21 comprises an input terminal 21A for receiving the output signal from the output terminal 15f of the latch circuit 15, an input terminal 21B for receiving the pulse $T_9$ from the clock generator 7, and an input terminal 21C for receiving the pulse S from the clock generator 7. The card detection unit 21 provides a card detection signal at an output terminal 21a thereof in accordance with the input signals to the input terminals 21A, 21B and 21C, and provides a control signal at an output terminal 21b thereof in accordance with the input signals to the input terminals 21A through 21C. The card detection signal from the output terminal 21a is "1" when the card 1 appears on the scanning line, and is "0" when the card 1 does not appear on the scanning line. When the output signal from the output terminal 15f of the latch circuit 15 at the time when the pulse $T_9$ changes from "0" to "1" is "1" more than 16 times during one scanning period, namely, a pariod beginning at the changing of the pulse S from "0" to "1" and ending at the following changing of the pulse S from "0" to "1", the card detection signal is "1" upon appearing of the leading edge of the following pulse S. The card detection signal is "0" upon appearing of the leading edge of the following pulse S when the output signal from the output terminal 15f of the latch circuit 15 is "1" less than 16 times. The control signal from the output terminal 21b changes from "0" to "1" when the changing of the pulse S from "0" to "1" occurs 32 times after the card detection signal changes to "1". The control signal returns to "0" when the pulse S changes from "0" to "1" 64 times after the card detection signal changes to "1".

Figure 12:
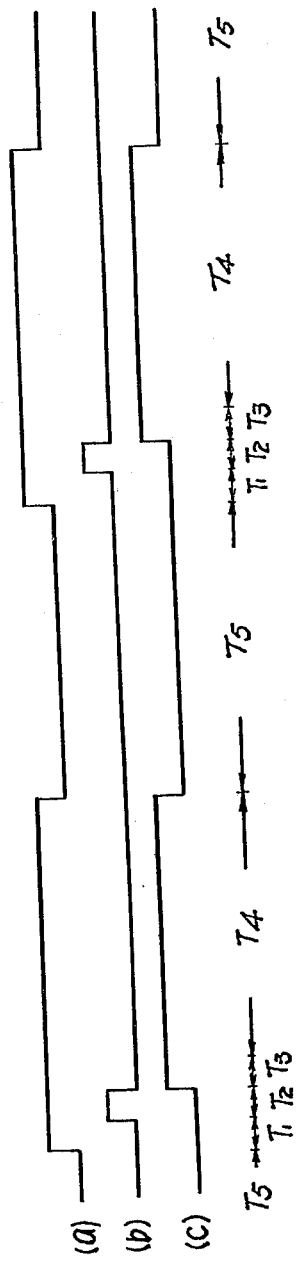
FIGS. 12 and 13 are time charts for the purpose of explanation of operation of the compensation circuit of FIG. 10.

FIG. 12 shows relationship between the card detection signal (FIG. 12(a)) and the control signal (FIG. 12(b)). Periods $T_1$ through $T_4$ correspond to the conditions where areas $L_1$ through $L_4$ of the card 1 (see FIG. 2) appear on the scanning line, whereas a period $T_5$ corresponds to the condition where the card 1 does not appear on the scanning line. The changing of the control signal (FIG. 12(b)) from "1" to "0" means that the information portion B of the card 1 is scanned in a near future. The shift register 17 stores the signal of 6 bits which is the A - D converted signal of the maximum output within 32 outputs of the respective 256 photodiodes via the latch circuit 15 and the data selector 16 during the control signal is "1". The information portion B is scanned 32 times in order to obtain one information signal. Thus stored 256 signals of 6 bits are circulated in the shift register 17 during the circulation control signal (FIG. 12 (c)) from an output terminal 22a of a shift register control 22, which operates in accordance with the output signals from the output terminals 21a and 21b, is "1", namely, during the periods $T_3$ and $T_4$.

Figure 13:
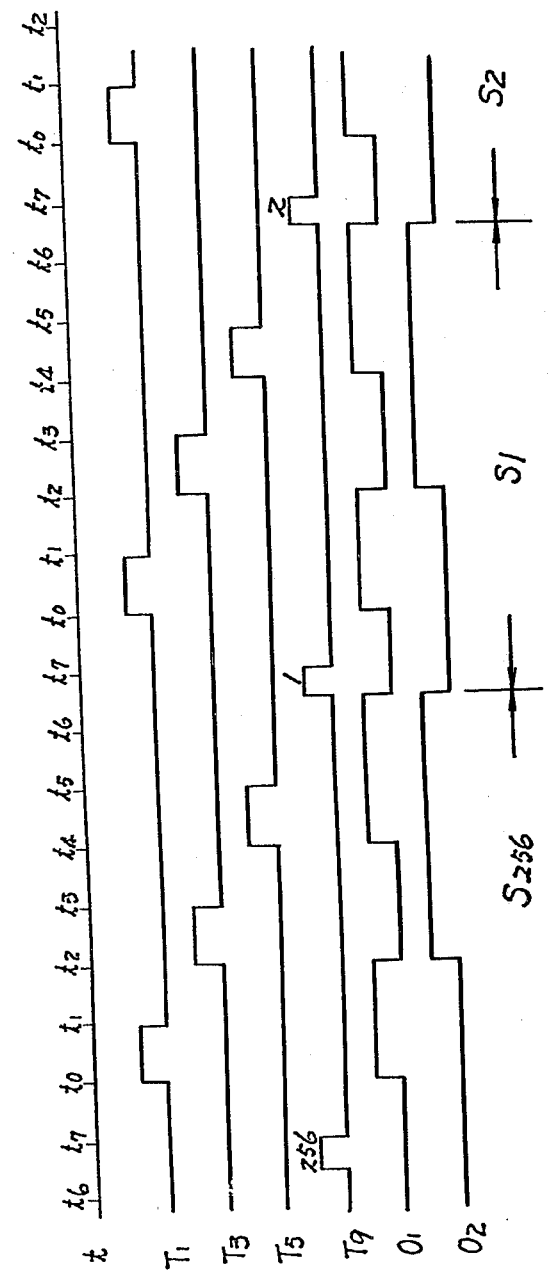

An address control 23 is connected to receive the pulses $T_1$, $T_3$, $T_5$ and $T_9$ from the clock generator 7, and provides output signals $O_1$ and $O_2$ (see FIG. 13) for AND gates 24 and 25. Timing relationship among these input and output signals is shown in FIG. 13.

An AND gate 26 provides a signal for the selection terminal 16H of the data selector 16 upon receiving the signal from the output terminal 20a of the comparator 20 and the control signal from the output terminal 21b of the card detection unit 21. An OR gate 27 provides a signal for the control terminal 18H of the latch circuit 18 upon receiving either the pulse $T_9$ or the signal generated from the output terminal 21b of the card detection unit 21. An inverter 28 is provided for applying the inverted pulse of the pulse $T_{10}$ from the clock generator 7 to the shift signal input terminal 17H of the shift register 17. An inverter 29 is provided for applying the inverted signal of the signal from the output terminal 21b of the card detection unit 21 to the other input terminals of the AND gates 24 and 25.

Flip-flops 30, 31 and 32 comprise input terminals $D_A$, $D_B$ and $D_C$, respective of which are connected to receive the output signal from the output terminal 20a of the comparator 20, and clock terminals $T_A$, $T_B$ and $T_C$, respective of which receive the pulses $T_1$, $T_3$ and $T_5$ from the clock generator 7. The flip-flops 30, 31 and 32 further comprise output terminals $Q_A$, $Q_B$ and $Q_C$ for outputting signals to the following recognition station 33. The recognition station 33 can be of a conventional construction and hence the details thereof have been omitted for the purpose of simplicity. The recognition station 33 receives the signals from the flip-flops 30 through 32, the pulses $T_9$ and S from the clock generator 7, and the card detection signal and the control signal form the card detection unit 21. It will be clear that the recognition station 33 can recognize the information written on the card 1 by scanning the card 1.

While the compensation circuit of FIG. 10 has been implemented in this manner, the operational modes thereof will be now discussed with reference to FIGS. 11 through 13.

In the first place, the signal applied from the AND gate 26 to the selection terminal of the data selector 16 assumes "0" because of the control signal from the output terminal 21b of the card detection unit 21 being "0" during the periods $T_5$ (where no card stands on the scanning line) and $T_1$. This follows that there is equivalency between the signal outputted through the output terminals 16a through 16f of the data selector and the signal inputted into the input terminals $16A_1$ through $16F_1$. The video signal through the amplifier 8 is A - D converted into the 6 bit signals $AD_o$ through $AD_5$ as it passes through the A - D converter, and then latched in the latch circuit 15 of which the output terminals 15a – 15f provide the respective outputs.

Emphasis is placed on the fact that the video signals $AD_o$ through $AD_5$, after being A - D converted, are loaded into six 256 bit shift registers forming the shift register 17 when the pulse $T_{10}$ changes from "0" to "1" because of both the control signal from the output terminal 21b and the circulation control signal to the shift register via the terminal 17h being "0" during the periods $T_5$ and $T_1$. Nevertheless, the remaining circuit elements do not act during these periods $T_5$ and $T_1$.

During the period $T_2$, the control signal (b) outputted through the terminal 21b of the card detection unit 21 assumes "1" as shown in FIG. 13, which permits the signal "1" to be impressed on the control terminal 18H of the latch circuit 18 through the OR gate 27 and permits the signals from the output terminals 18a through 18f of the latch circuit 18 to be identical with the signals transferred from the shift register 17 to the input terminals 18A through 18F. Simultaneously, inversion is given for the control signal "1" through the inverter 29, the resultant control signal "0" being impressed on the AND gates 24 and 25 which provide the signal of the level "0" for the upper 2 bit input terminals 19G and 19H of ROM 19. As a result of this, the signals outputted through the output terminals 19a through 19f of ROM 19 are equalized to that at the lower 6 bit input terminals 19A through 19F. In other words, the latch circuit 18 and ROM 19 do not substantially function during the period $T_2$. At this time, the input signals to the input terminals $20A_2$ through $20F_2$ of the comparator 20 are signals which are transferred from the shift register 17 via the latch 18 and ROM 19. As will be described below in greater detail, when the control signal from the output terminal 21b of the detector unit 21 alters from "0" to "1" and the pulse $T_9$ also alters from "0" to "1", the input terminals $20A_1$ through $20F_1$ of the comparator 20 receive the first 6 bit video signals $AD_o$ through $AD_5$ from the output terminals 15a through 15f of the latch 15 after A - D conversion (the control signal from the output terminal 21b changes when the pulse S alters from "0" to "1" and the pulse S appears upon the occurrence of the 256 th pulse $T_9$). The input terminals $20A_2$ through $20F_2$ of the comparator 20 receive the first 6 bit video signals operable for the preceeding scanning form the output terminals 19a through 19f of ROM 19. Therefore, if the first video signals which are being scanned are higher than that previously scanned, then the output terminal 20a of the comparator 20 provides the signal of "0" level such that the selection signal entered to the selection terminal 16H of the data selector 16 through the AND gate 26 assumes "0". The data selector 16, therefore, transmits the first video signals being scanned to the shift register 17. When the pulse $T_{10}$ changes from "0" to "1", these video signals are loaded into the shift register as described above.

In contrast with the foregoing, if the reverse environment is encountered, the comparator 20 provides the output signal of level "1" at its output terminal 20a and such output signal cooperates with the control signal through the output terminal 21b of the card detection unit 21 to supply the selection signal "1" with the selection terminal 16H of the data selector 16 through the AND gate 26. When this occurs, the previously scanned video signals from the latch circuit 18 are entered to the data selector 16 via the input terminals $16A_2$ through $16F_2$ and then to the shift register 17 via the output terminals 16a through 16f.

It will be apparent from the above description that the comparator 20 compares the n th video signals being now scanned ($n = 1, 2, - 256$) with the n th video signals being previously scanned, the higher video signals being applied via the data selector 16. When the next scanning initiates upon completion of the previous scanning. 256 bit shift registers of the shift register 17 store the higher video signals at their M th bit positions ($M = 1, 2, - 256$). When the control signal through the output terminal 21b changes from "1" to "0", the highest 256 video signals within 32 time scanning procedures are stored in the shift register 17. Such selection of the highest video signals is due to the reason that the video signals given under the influence of impurities or foreign substances will not try to serve as outputs for the white portion (the portion A).

During the time periods $T_3$ and $T_4$ as shown in FIG. 12 the control signal (b) outputted through the output terminal 21b of the card detection unit 21 assumes "0" such that the signal "0" develops at the selection terminal of the data selector 16 and the AND gates 24 and 25 receive the signals "1" inverted through the inverter 29. The OR gate 27 is controlled only by the pulse $T_9$. Under these circumstances the shift register control 22 responsive to the output signals through the output terminals 21a and 21b places the signal "0" on the circulation control terminal 17h of the shift register 17 such that register 17 circulates and stores the video signals (corresponding to the output compensation section A of the card 1). ROM 19 functions to develop in succession 85%, 75% and 50% of the output corresponding to the output compensation section A during the time periods $T_3$ and $T_4$.

The conditions for establishing these portions of the output will be discussed in more detail with reference to FIG. 13.

Before the control signal (FIG. 12 (b)) changes from "1" to "0" and the first pulse $T_9$ returns to "1", i.e., during the period $S_1$, the comparator 20 receives at its input terminals $20A_1 . 20F_1$ the first 6 bit video signals subject to the scanning procedure through the output terminals 15A – 15F of the latch circuit 15, whereas ROM 19 receives at its input terminals 19A – 19F the first video output within the reference video signals corresponding to the output compensation section through the latch circuit 18. At the transition from $t_0$ to $t_2$ of the clock pulse t during the period $S_1$, the output signals $O_1$ and $O_2$ from the address control 23 assume "1" and "0" respectively which in turn are supplied to the input terminals 19G and 19H of ROM 19. As a result, the input terminals $20A_2 - 20F_2$ of the comparator 20 receive about 85% of the first video signals associated with the output compensation or reference section. The comparator 20, therefore, determines whether the video output form via the latch circuit 15 the first photodiode subject to the instantaneous scanning procedure is higher than 85% of the output and produces at its output terminal 20a the signal "1" if the former is lower than the latter and the signal "0" if not, the thus obtained signals "1" and "0" being impressed on the input terminals $D_A$, $D_B$ and $D_C$ of the flip flops 30, 31 and 32. The flip flop 30 permits the output signal of the comparator 20 to be transfered to the succeeding recognition circuit 33 via the output terminal $Q_A$ at the timing $t_1$ of the clock pulse T upon application of the pulse $T_1$ to the pulse $T_1$.

During period from $t_2$ to $t_4$ for $S_1$ the output signals $O_1$ and $O_2$ from the address control 23 assume "0" and "1" respectively which are transferred to the input terminals 19G and 19H of ROM 19 via the AND gates 24 and 25. This follows that about 75% of the first video output corresponding to the output compensation section develops at the input terminals $20A_2$ through $20F_2$ of the comparator 20. The comparator 20 compares 75% value of the video output with the first output being scanned in the same manner as the case described associated with the 85% value, and then produces the signal "1" or "0" in dependence upon the difference. Likewise, the thus obtained signal "1" or "0" is applied to the flip flops. The flip flop 31 permits the output signal from the comparator 20 to be sent via the output terminal $Q_B$ to the recognition circuit 33 at the time $t_3$ in response to application of the pulse $T_3$ to the clock terminal $T_B$. Furthermore, for the period from $t_4$ to $t_6$ in $S_1$, ROM 19 receives at its input terminals 19G and 19H the signals "1" and "0" through the AND gates 24 and 25 because of the output signals $O_1$ and $O_2$ from the address control 23 being both "1". The result is that about 50% of the first video output corresponding to the output compensation section develops at the input terminals $20A_2$ through $20F_2$ of the comparator 20. Under the circumstances, the comparator 20 compares the 50% value of the video output with the first output for the current scanning procedure and similarly produces the signal "1" or "0" in accordance with the difference. The signal "1" or "0" is impressed on the flip flops. In particular, the flip flop 32 responds to the pulse $T_5$ applied to the clock terminal $T_C$ to permit the output signal of the comparator 20 to be sent to the recognition circuit 33 via the output terminal $Q_C$.

As will be well known to those skilled in the art, the recognition circuit 33 recognizes the signal of level "1" as the presence of a record on the information region B of the card 1 and the signal of level "0" as the absence of a record on the information region B.

The invention being thus described, it will be obvious that the same way be varied in many ways. Such variations are not to be regarded as a departure from the spirit and scope of the invention, and all such modifications are intended to be included within the scope of the following claims.

What is claimed is:

1. A level determination system providing quantized information signals for use in an optical character reader for reading information written on a card having a reference portion and an information portion, the improvement comprising:

a photosensor means for scanning said reference and information portions including N photosensitive elements providing N unique video reference signals for said reference portion of said card and N unique video information signals for said information portion of said card, the said information signals being representative of the information written on said card;

storage means having N storage sections therein and responsive to the maximum value of each said N unique video reference signals for storing same in a corresponding one of said N storage sections to thereby store a reference level signal peculiar to the operating conditions of each of said N photosensitive elements in said storage means for each and every card to be read; and quantizing means responsive to said video signals comparing each of said N video information signals with the corresponding one of said N unique video reference signals in said storage means and providing N quantized information signals as respective functions of said comparisons.

2. The level determination system of claim 1 which further comprises:

amplifier means for amplifying the video reference and information signals from said photosensor means; and a peak value follower responsive to said amplified video signals for minimizing affects caused by a drift of the said amplifier means and providing a stabilized video output from said photosensor means.

3. The level determination system of claim 1 which further comprises:

a sliced level generator means responsive to each of said N unique video reference signals for providing S sliced levels for each said unique reference; and said quantizing means further including means comparing each of said S sliced levels with each of said N unique video information signals to provide S quantized information signals in each of N groups of the latter.

4. The level determination system of claim 3 wherein S is the integer four and said sliced levels are respectively 1.0, 0.85, 0.75 and 0.5 times the value of each said N unique video reference signals.

* * * * *